(12) United States Patent
Kawai

(10) Patent No.: US 8,115,978 B2
(45) Date of Patent: Feb. 14, 2012

(54) INFORMATION PROCESSING METHOD AND INFORMATION PROCESSING APPARATUS FOR SIMULATING A RESULT OUTPUT FROM A FIRST OUTPUT DEVICE BASED ON INPUT DATA REPRESENTED IN A COLOR SPACE THAT IS DEPENDENT ON THE INPUT DEVICE BY A SECOND OUTPUT DEVICE

(75) Inventor: Yoshinori Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 11/530,323

(22) Filed: Sep. 8, 2006

(65) Prior Publication Data

US 2007/0058185 A1    Mar. 15, 2007

(30) Foreign Application Priority Data

Sep. 12, 2005    (JP) ................................. 2005-264439

(51) Int. Cl.
    *G03F 3/08* (2006.01)
(52) U.S. Cl. ........ 358/518; 358/504; 382/162; 382/167; 345/589; 345/603; 345/604
(58) Field of Classification Search .................. 358/1.9, 358/518, 1.16, 504; 382/162, 167; 345/589, 345/603, 604
See application file for complete search history.

(56) References Cited

U.S. PATENT DOCUMENTS

| 5,463,480 | A | * | 10/1995 | MacDonald et al. | ......... 358/520 |
| 5,754,184 | A | * | 5/1998 | Ring et al. | ..................... 345/604 |
| 5,767,992 | A | * | 6/1998 | Tanaka et al. | ................. 358/520 |
| 6,603,483 | B1 | | 8/2003 | Newman | |

FOREIGN PATENT DOCUMENTS

| JP | 09-193477 A | 7/1997 |
| JP | 2001-218079 A | 8/2001 |
| JP | 2002-281338 A | 9/2002 |
| JP | 2005-109583 A | 4/2005 |

\* cited by examiner

*Primary Examiner* — King Poon
*Assistant Examiner* — Jamares Q Washington
(74) *Attorney, Agent, or Firm* — Canon U.S.A., Inc., IP Division

(57) ABSTRACT

Input data in a color space dependent on input device is converted into first data in a device-independent color space based on input viewing condition. Through forward conversion based on a perception model corresponding to the input viewing condition, the first data is converted into second data in a color perception space in accordance with specified color-space compression mode. The second data is converted into third data through color-space compression based on a gamut of first output device. The third data is converted into fourth data through color-space compression based on a gamut of second output device. Through inverse conversion based on a perception model of the second output device, the fourth data is converted into fifth data in a device-independent color space based on viewing condition of the second output device. The fifth data is converted into output data in a color space dependent on the second output device.

5 Claims, 13 Drawing Sheets

INFORMATION PROCESSING METHOD AND INFORMATION PROCESSING APPARATUS FOR SIMULATING A RESULT OUTPUT FROM A FIRST OUTPUT DEVICE BASED ON INPUT DATA REPRESENTED IN A COLOR SPACE THAT IS DEPENDENT ON THE INPUT DEVICE BY A SECOND OUTPUT DEVICE

BACKGROUND OF THE INVENTION

1. Field of the Invention

The present invention relates to information processing methods and information processing apparatuses.

2. Description of the Related Art

FIG. 1 is a diagram showing a scheme of ordinary color matching based on ICC profiles defined by the International Color Consortium (ICC). A profile connection space (PCS) linking profiles is based on the XYZ values and Lab values of white light D50.

RGB data input under the white light D50 is converted into device-independent values in an XYZ color space on the basis of an input profile. The resulting color space includes out-of-gamut colors that cannot be represented by an output device. Thus, color-space compression is executed via the PCS on the input data having been converted into data represented in the device-independent color space so that all the colors can be represented within the color gamut of the output device. After the color-space compression, the input data represented in the device-independent color space is converted into RGB data or CMYK data represented in a color space that is dependent on the output device. In processing based on ICC profiles, the conversion from the input color space to the XYZ color space and the conversion from the XYZ color space to the output color space are executed using a matrix or a lookup table (LUT).

A problem of the ICC profiles is that the reference white point and environment illumination are fixed.

FIG. 2 is a diagram showing a scheme of color matching in which the problem of ICC profiles is taken into consideration. In the color matching, input data that is dependent on a color space of an input device is converted into data represented in a device-independent color space on the basis of an input viewing condition, and the data is converted (forward-converted) into data represented in a human color perception space. Then, color-space compression is executed in consideration of the color gamut of the input device and the color gamut of the output device, and the data obtained through the color-space compression is converted (inverse-converted) into data represented in a device-independent color space on the basis of an output viewing condition. Then, the data is converted into output data represented in a color space that is dependent on the output device.

Color conversion from an input device to an output device according to the related art has been described above. In some cases, color matching is executed for the purpose of outputting input data to two different output devices, i.e., for the purpose of simulating or previewing an output to one of the output devices (first output device) by the other output device (second output device). In such cases, it is expected that an expected output to the first output device is reproduced by the second output device. Particularly, when the first output device is a printer and the second output device is a monitor, an output by the printer can be previewed on the monitor before printing. It will be understood that a high demand exists for such techniques. This has hitherto been achieved through the following techniques.

FIG. 3 is a diagram showing a scheme of use of ICC profiles. First, input data is converted from RGB values to XYZ values on the basis of an input profile. The XYZ values are converted into CMYK values on the basis of a printer output profile having a compressed color space, thereby obtaining output data for a printer. Furthermore, the printer data is converted from CMYK values to XYZ values on the basis of a printer input profile. The XYZ values are converted into RGB values on the basis of a monitor output profile having a compressed color space, thereby obtaining output data for a monitor.

FIG. 4 is a diagram showing a scheme of the method according to the related art described above. Input data is converted into XYZ values on the basis of a viewing condition 1 of input, the XYZ values are converted into data represented in a human color perception space, and color-space compression is executed in consideration of the color gamuts of the input data and the printer. Then, the values obtained through the color-space compression are converted into XYZ values on the basis of a viewing condition 2 of the printer, and the XYZ values are converted into data represented in the human color perception space. Then, color-space compression is executed on the data represented in the human color perception space in consideration of the color gamuts of the printer and the monitor. Then, the values obtained through the color-space compression are converted into XYZ values on the basis of a viewing condition 3 of the monitor. Finally, the XYZ values are converted into RGB values that are dependent on the monitor.

When ICC profiles are used, the reference white point and environment illumination are fixed, so that the problem remains.

On the other hand, when the method according to the related art is used, although the problem can be solved, color conversion must be executed ten times. When an output of the printer is to be previewed on the monitor before printing, a fast processing speed is desired. Thus, an improvement is desired to reduce time needed for the large number of times of color conversion.

Furthermore, when color conversion is executed for the purpose of previewing, data is not necessarily output to the printer. When the result of previewing differs from the expectation of the user, the data is not output from the printer. The user modifies the input data, changes the printer profile, changes the mode of color-space compression from input data to printer data, or otherwise performs an adjustment. In this case, it is useless to generate printer data, which is not output from the printer.

SUMMARY OF THE INVENTION

The present invention provides techniques for solving the problem of the reference white point and environment illumination associated with the use of ICC profiles and the problem of reduction in processing speed due to a large number of times of color conversion so that flexibility regarding environment illumination or the like is improved and so that processing speed is increased. Also, the present invention provides techniques for achieving color matching so that when input data is to be output to two different output devices, an output to one of the output devices can be simulated or previewed by an output to the other output device.

According to an aspect of the present invention, there is provided an information processing method for executing color matching between an input device and a first output device, and outputting, by a second output device, a result of outputting image data input from the input device by the first output device. The information processing method includes a first converting step of converting input data represented in a color space that is dependent on the input device into first data represented in a device-independent color space based on an input viewing condition; a second converting step of executing a forward conversion based on a perception model corresponding to the input viewing condition on the first data to convert the first data into second data represented in a color perception space corresponding to a specified color-space compression mode; a third converting step of converting the second data into third data by executing color-space compression in accordance with a color gamut of the first output device; a fourth converting step of converting the third data into fourth data by executing color-space compression in accordance with a color gamut of the second output device; a fifth converting step of executing an inverse conversion based on a perception model of the second output device on the fourth data to convert the fourth data into fifth data represented in a device-independent color space based on a viewing condition of the second output device; and a sixth converting step of converting the fifth data into output data represented in a color space that is dependent on the second output device for outputting to the second output device.

According to another aspect of the present invention, there is provided an information processing apparatus for executing color matching between an input device and a first output device, and outputting, by a second output device, a result of outputting image data input from the input device by the first output device. The information processing apparatus includes a first converter for converting input data represented in a color space that is dependent on the input device into first data represented in a device-independent color space based on an input viewing condition; a second converter for executing a forward conversion based on a perception model corresponding to the input viewing condition on the first data to convert the first data into second data represented in a color perception space corresponding to a specified color-space compression mode; a third converter for converting the second data into third data by executing color-space compression in accordance with a color gamut of the first output device; a fourth converter for converting the third data into fourth data by executing color-space compression in accordance with a color gamut of the second output device; a fifth converter for executing an inverse conversion based on a perception model of the second output device on the fourth data to convert the fourth data into fifth data represented in a device-independent color space based on a viewing condition of the second output device; and a sixth converter for converting the fifth data into output data represented in a color space that is dependent on the second output device for outputting to the second output device.

Further features of the present invention will become apparent from the following description of exemplary embodiments with reference to the attached drawings.

DESCRIPTION OF THE EMBODIMENTS

Now, embodiments of the present invention will be described in detail with reference to the accompanying drawings.

First Exemplary Embodiment

Figure 11:
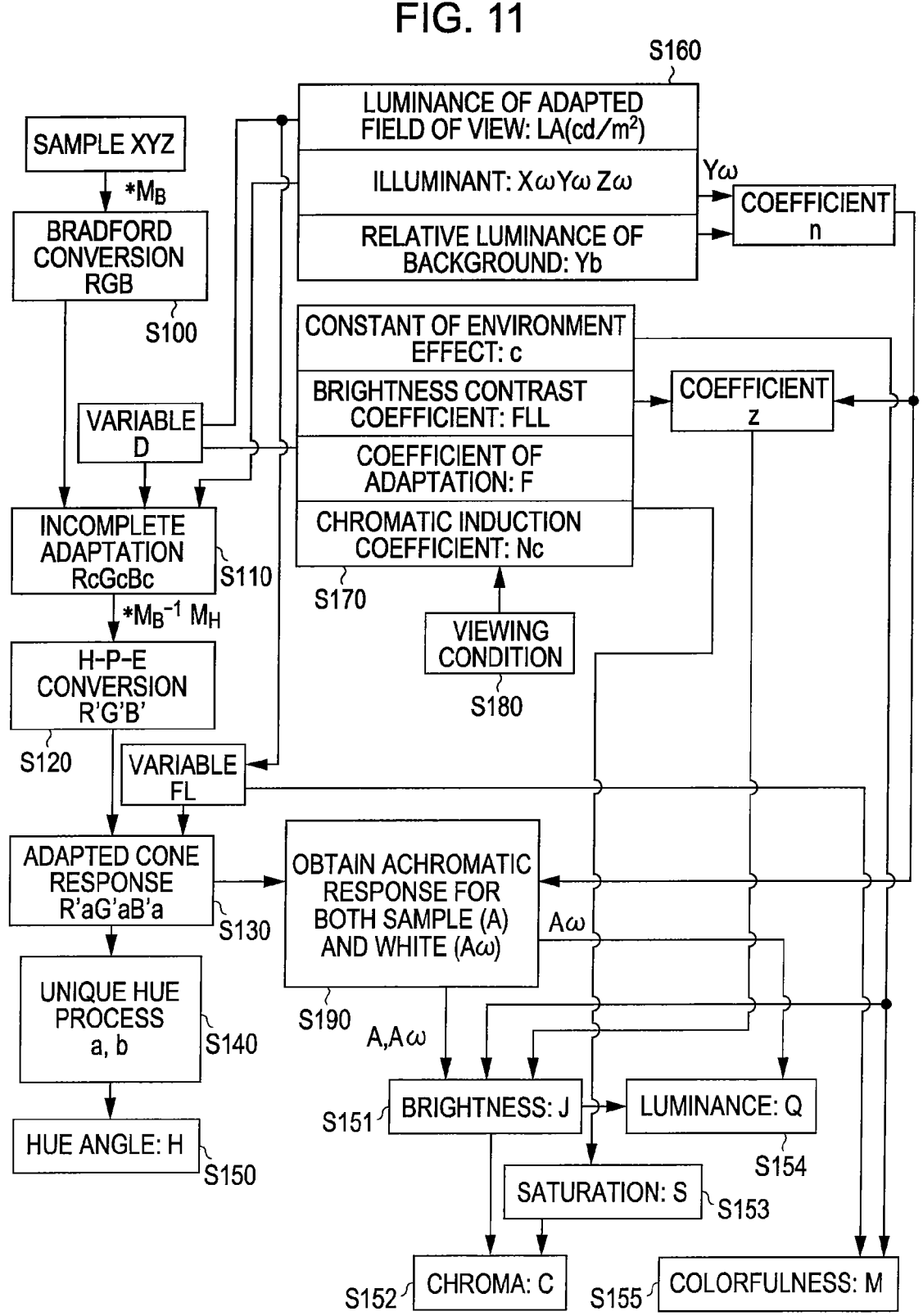
FIG. 11 is a diagram illustrating color perception models used for color matching in an exemplary embodiment of the present invention.

First, color perception models used for color matching in embodiments of the present invention will be described with reference to FIG. 11.

It is known that colors perceived by the human vision differ depending on conditions such as the type of illuminating light or the background of stimulus even when the light entering the eyes is the same.

For example, the color of white presented by illumination of an incandescent light bulb is not perceived as reddish as the characteristics of light entering the eyes but is perceived as white. Also, when white placed in a black (dark) background is compared with white placed in a bright background, white is perceived as brighter when placed in a black background. The former phenomenon is known as chromatic adaptation, and the latter phenomenon is known as contrast. Thus, colors must be displayed in terms of amounts corresponding to physiological activities of visual cells distributed on the retina, instead of XYZ values. For this purpose, color perception models have been developed. The Commission Internationale de l'Eclairage (CIE) recommends the use of CIECAM02. The color perception model is based on three physiological primary colors of the color vision. This is considered as a color representation scheme in which, for example, the values of H (hue), J (brightness), and C (chroma) or the values of H (hue), Q (brightness), and M (colorfulness), which are parameters related to color perception, do not depend on viewing conditions. By reproducing colors so that the values of H, J, and C or the values of H, Q, and M match between devices, the problem of difference in viewing condition between input image and output image can be overcome.

Now, processing for the forward conversion according to the color perception model CIECAM02, in which correction (conversion from XYZ to HJC or HQM) is executed in accordance with a viewing condition of an input image, will be described below.

First, in step S160, as viewing-condition information of an input image, LA representing a luminance in an adapted field of view (cd/m$^2$, a value corresponding to 20% of the luminance of white in the adapted field of view is usually chosen), XYZ values representing relative tristimulus values of a sample in a light-source condition, $X\omega Y\omega Z\omega$ representing relative tristimulus values of white light in a light-source condition, and Yb representing a relative luminance of background in a light-source condition are set.

In step S180, a type of viewing condition is specified. In step S170, on the basis of the type specified, as viewing-condition information of an input image, a constant c of environment effect, a chromatic induction coefficient Nc, a brightness contrast coefficient FLL, and a degree-of-adaptation coefficient F are set.

On the basis of the input-image viewing-condition information set in steps S160 and S170, the XYZ values of the input image are processed in the following manner.

First, in step S100, on the basis of Bradford's three primary colors, which are considered as human physiological three primary colors, the XYZ values are converted to obtain Bradford cone response RGB. The human vision does not always adapt completely to an observed light source. Thus, in step S110, a variable D representing a degree of adaptation is obtained on the basis of the luminance level and environment conditions (LA and F), and an incomplete adaptation is executed on the RGB values on the basis of the variable D and $X\omega Y\omega Z\omega$, thereby converting the RGB values into RcGcBc values.

Then, in step S120, on the basis of the Hunt-Pointer-Estevez three primary colors, which are considered as human physiological three primary colors, the RcGcBc values are converted to obtain Hunt-Pointer-Estevez cone response R'G'B'. In step S130, the degree of adaptation is estimated on the basis of the intensity level of stimulus regarding the R'G'B' values, thereby calculating cone response R'aG'aB'a that have been adapted both to the sample and white. In step S130, non-linear response compression is executed using the variable FL, which is obtained on the basis of the luminance LA in the adapted field of view.

Then, the following processing is executed in order to find correlation with appearance.

In step S140, red/green and yellow/blue opponent color response ab is obtained from the R'aG'aB'a values. In step S150, a hue H is obtained from the opponent color response ab and an eccentricity coefficient.

Furthermore, in step S190, a background induction coefficient n is obtained from $Y\omega$ and the relative luminance Yb of the background, and achromatic responses A and $A\omega$ for the sample and white are obtained using the background induction coefficient n. Furthermore, in step S151, the brightness J is obtained on the basis of a coefficient z obtained from the background induction coefficient n and the brightness contrast coefficient FLL and on the basis of the achromatic responses A and $A\omega$ and the constant c. Then, in step S153, a degree of saturation S is obtained from the chromatic induction coefficient Nc. Then, in step S152, the chroma C is obtained from the degree of saturation S and the brightness J. Then, in step S154, the luminance Q is obtained from the brightness J and the achromatic response $A\omega$ for white. Furthermore, in step S155, the colorfulness M is obtained from the variable FL and the constant c of environment effect.

Figure 1:
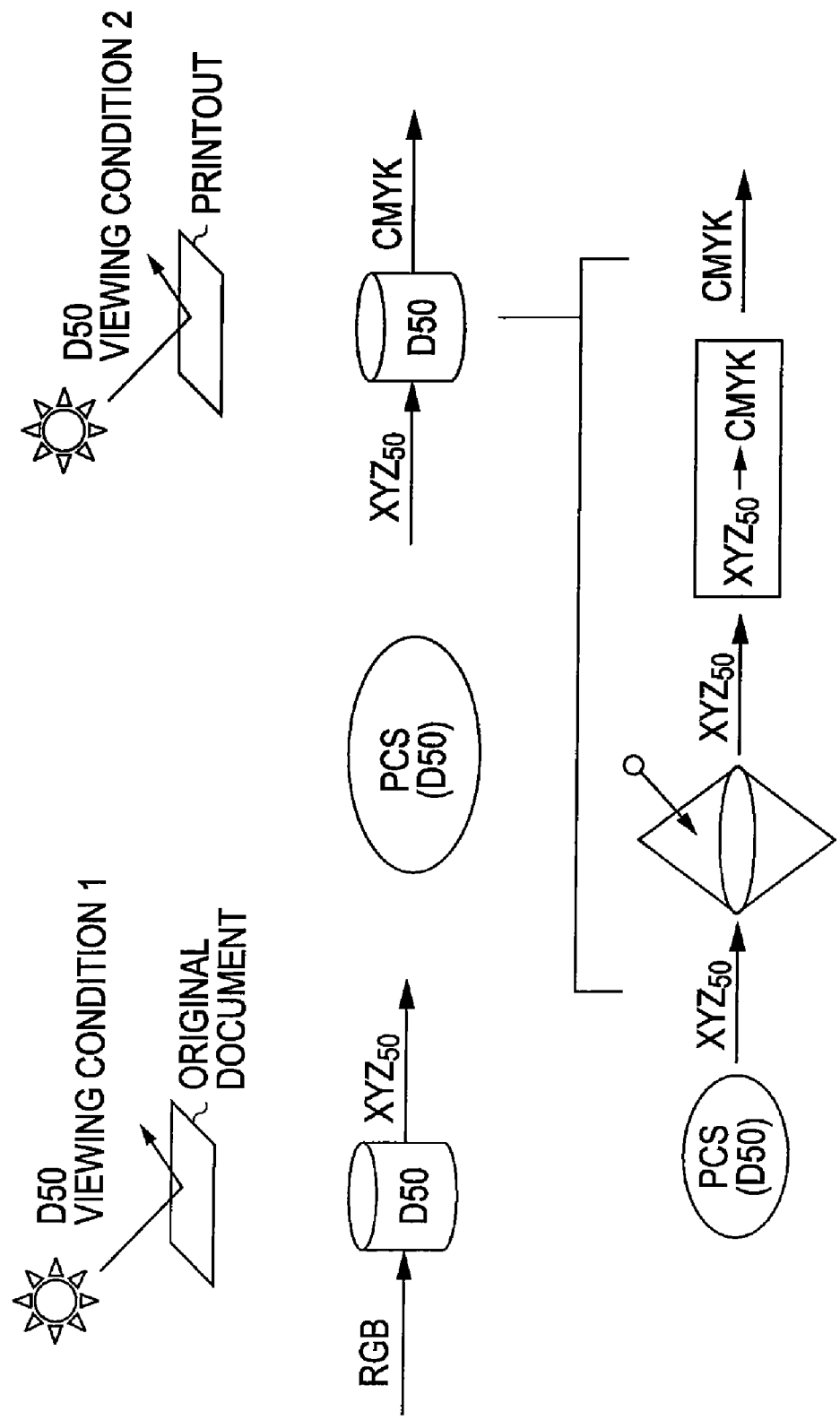
FIG. 1 is a diagram showing a scheme of ordinary color matching according to the related art.
Figure 2:
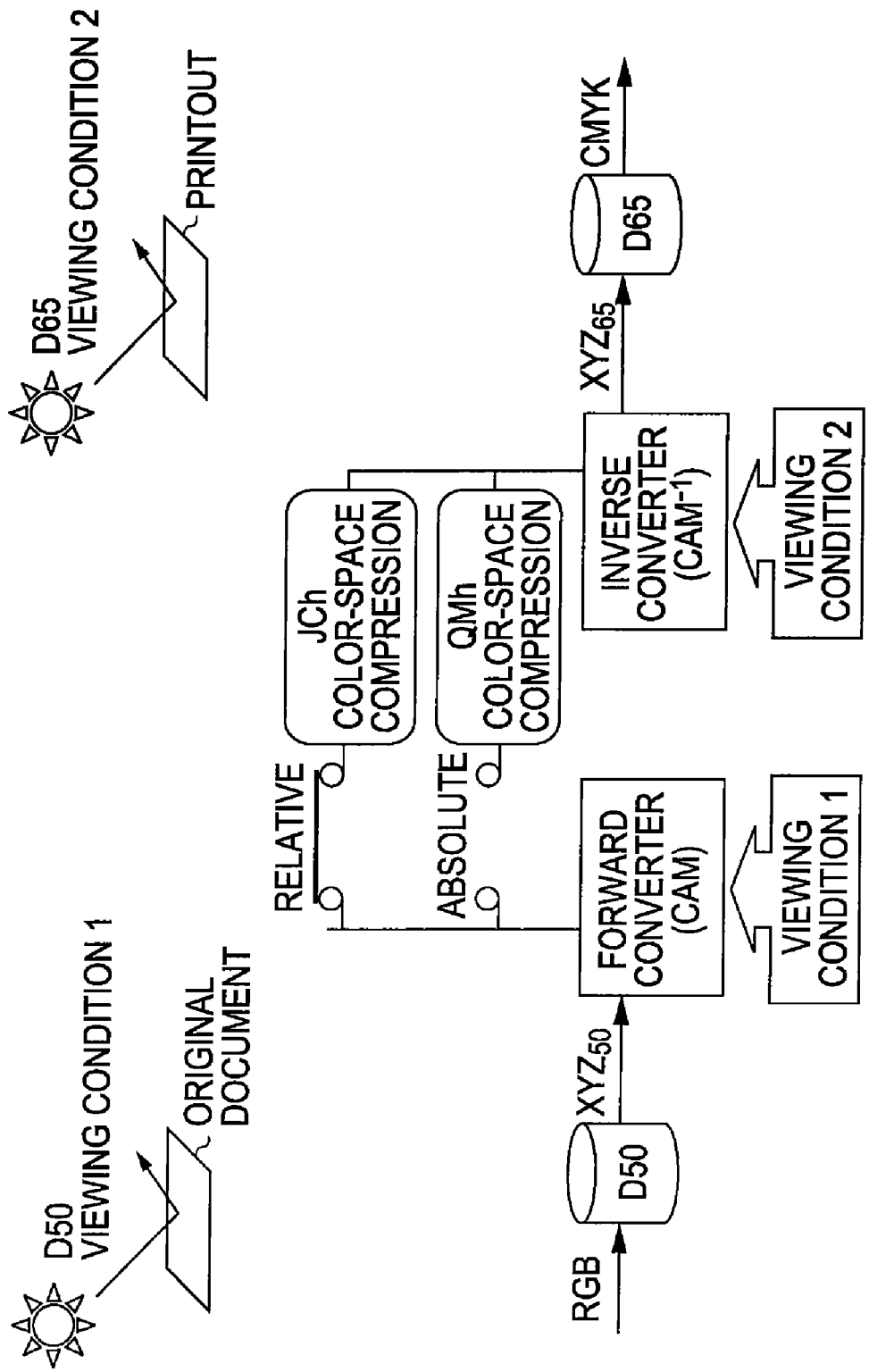
FIG. 2 is a diagram showing a scheme of color matching based on color perception models.
Figure 3:
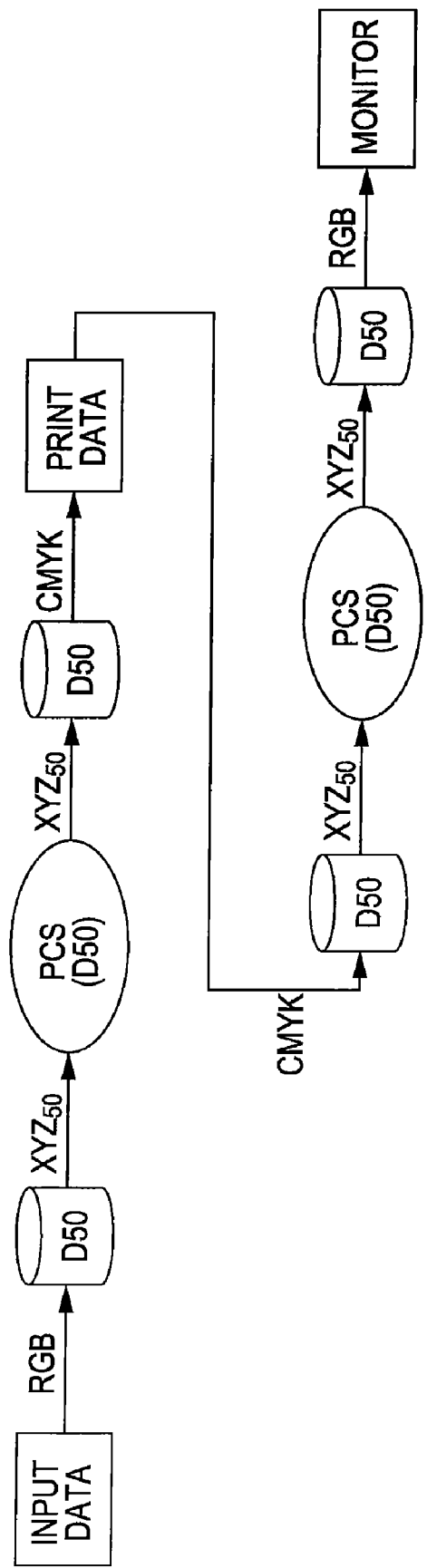
FIG. 3 is a diagram showing a scheme of ordinary color matching according to the related art, for the purpose of previewing an output of a printer by a monitor.
Figure 4:
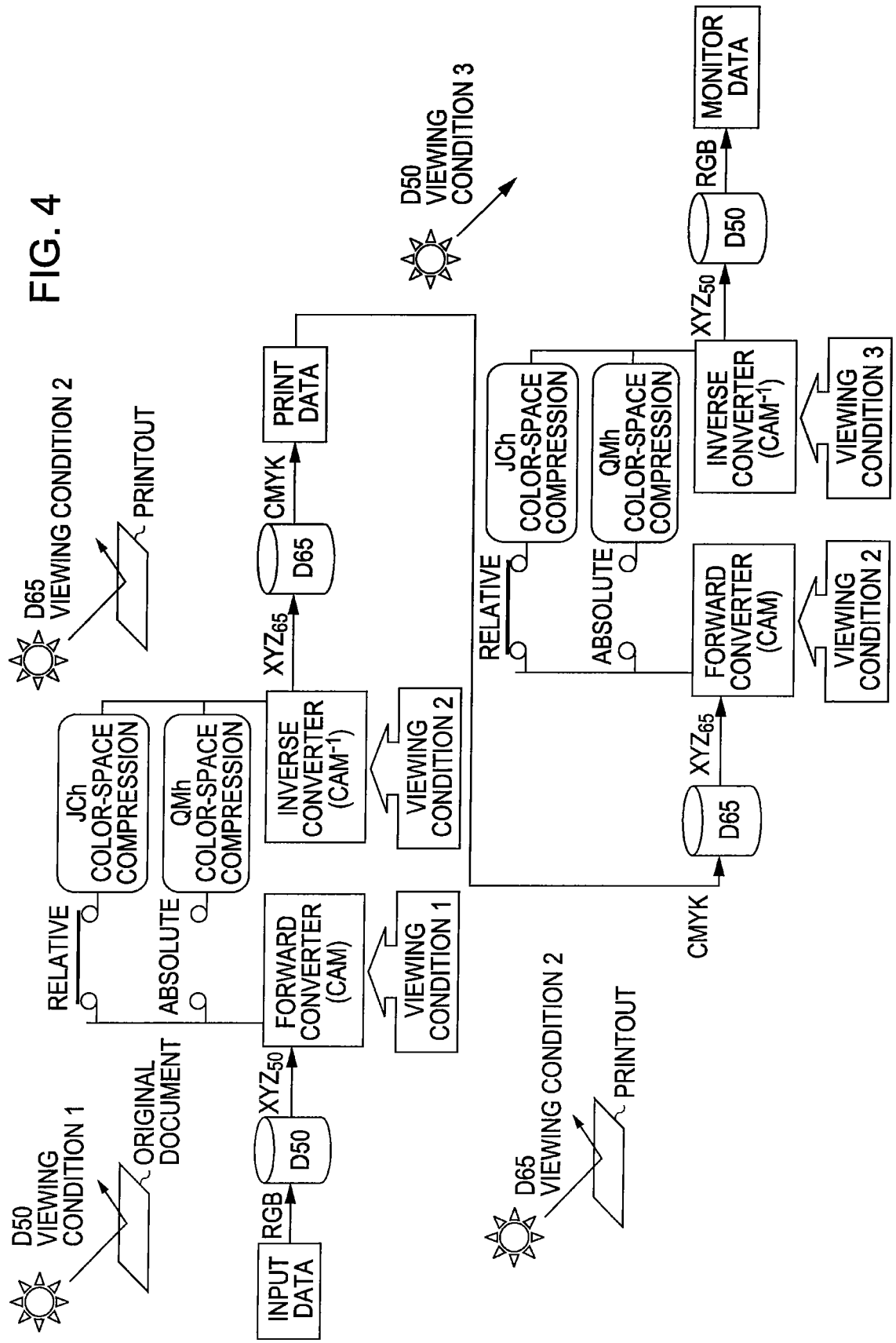
FIG. 4 is a diagram showing a scheme of color matching based on color perception models, for the purpose of previewing an output of a printer by a monitor.
Figure 5:
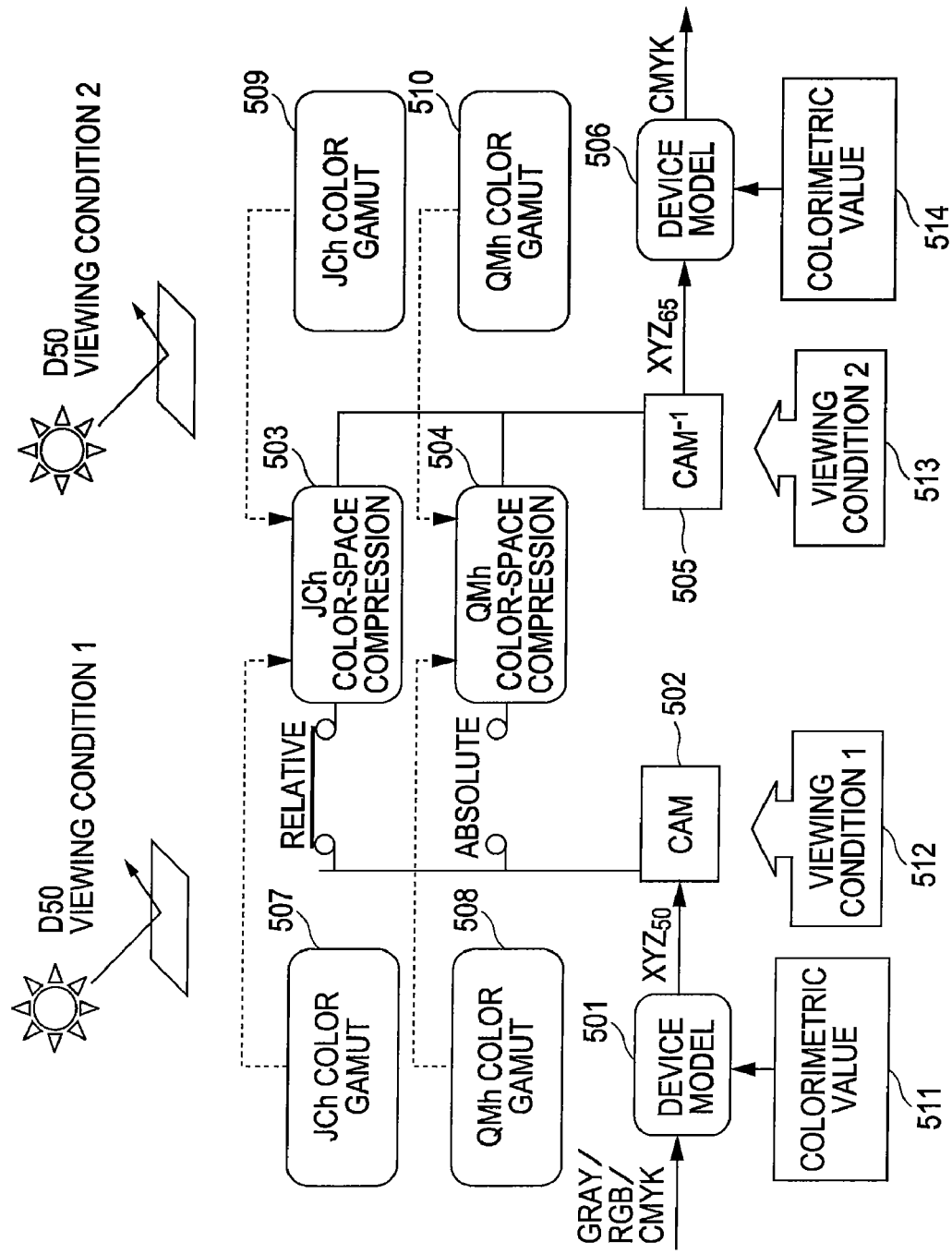
FIG. 5 is a diagram showing a configuration for color matching based on color perception models in an exemplary embodiment of the present invention.

FIG. 5 illustrates a scheme of color matching based on color-space compression on a human color perception space according to this exemplary embodiment.

First, an input device model 501 and an output device model 506 are generated using calorimetric values 511 and calorimetric values 514. A device model involves a forward conversion (corresponding to AToBTag of an ICC profile) and an inverse conversion (corresponding to BToATag of an ICC profile). Device characterization refers to generation of conversion data for carrying out the forward conversion (from device-dependent data to device-independent data) and generation of conversion data for carrying out the inverse conversion (from device-independent data to device-dependent data).

For the generation of forward conversion data, a colorimetric-value file (511 or 514) describing correspondence between device colors and calorimetric values is read, and a multi-dimensional LUT or a converting equation for carrying out conversion from device colors to XYZ values is generated. For the generation of inverse conversion data, using results of the forward conversion, a multi-dimensional LUT or a converting equation for carrying out conversion from XYZ values to device colors is generated, for example, by reverse mapping based on the forward multi-dimensional LUT or optimization of parameters of a polynomial through regression analysis. The color space of the calorimetric values and the device-independent color space need not necessarily be based on XYZ, and may be based on Lab, Luv, or the like.

Then, a color gamut 507 (or 508) of the input device and a color gamut 509 (or 510) of the output device on a human color perception space are obtained. In the case of a relative mode, JCh is selected as the human color perception space. In the case of an absolute mode, QMh is selected as the human color perception space.

The color gamut 507 (or 508) of the input device can be obtained by applying the forward conversion of the color perception model to the XYZ values of the input device, obtained from the calorimetric values of the colorimetric-value file 511 and the result of the forward conversion of the device model 501, and creating a three-dimensional convex hull of the resulting JCh (or QMh) values. The color gamut is a three-dimensional range including the resulting JCh (or QMh) values.

Similarly, the color gamut 509 (or 510) of the output device can be obtained by applying the forward conversion of the color perception model to the XYZ values of the output device obtained from the calorimetric values of the colorimetric-value file 514 and the result of the forward conversion of the device model 506, and creating a three-dimensional convex hull of the resulting JCh (or QMh) values.

An input viewing condition 512 is set in the input-device color perception model, and an output viewing condition 513 is set in the output-device color perception model. The color perception models are not limited to CIECAM02 or CIECAM97s, and may be other color perception models that allow prediction of human color perception parameters J, C, Q, M, h, and H.

On the basis of the input and output device models and color gamuts, color matching is executed. Color conversion from input device colors to output device colors in consideration of color-space compression on the human color perception space JCh can be executed in the following manner.

First, the forward conversion of the input device model 501 is applied to input colors to obtain XYZ values. Then, the forward conversion of a color perception model 502 based on the input viewing condition 512 is applied to obtain JCh values. Then, color-space compression 503 is executed on the basis of the color gamut 507 of the input device and the color gamut 509 of the output device. It is possible to use different modes of color-space compression in accordance with the type of color reproduction desired by the user, such as perceptual color reproduction, saturation color reproduction, calorimetric color reproduction, preferred color reproduction, or memory color reproduction. The inverse conversion of the color perception model 505 based on the output viewing condition 513 is applied to the JCh values after the color-space compression to obtain XYZ values. Then, the inverse conversion of the output device model 506 is applied to obtain output colors.

Color conversion from input device colors to output device colors in consideration of color-space compression on the human color perception space QMh can be executed in a similar manner on the basis of the color gamut 508 of the input device, the color gamut 510 of the output device, color-space compression 504, and so forth.

According to the color matching shown in FIG. 5, optimal color space compression can be achieved for a combination of color gamuts of an input device and an output device involved in color matching.

This exemplary embodiment will be described in the context of a case where, when input data is output to two different output devices, an output of one of the output devices (first output device) is simulated or previewed by the other output device (second output device). That is, assuming that the first output device is a printer and the second output device is a monitor, before outputting data from the printer as the first output device, the data is output to the monitor as the second output device to preview colors that will be output from the printer.

Figure 6A:
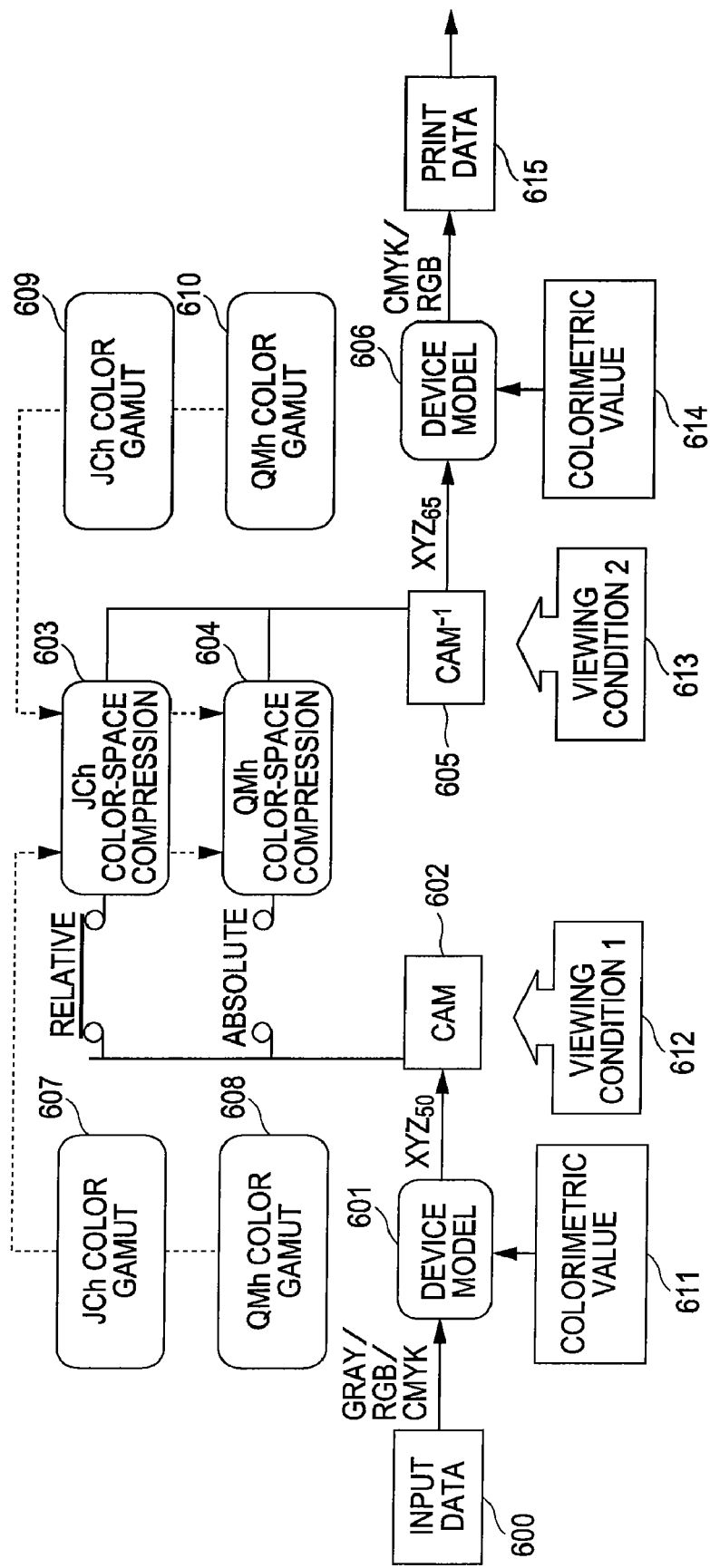
FIGS. 6A and 6B are block diagrams showing an ordinary configuration for previewing an output of a printer by a monitor.
Figure 6B:
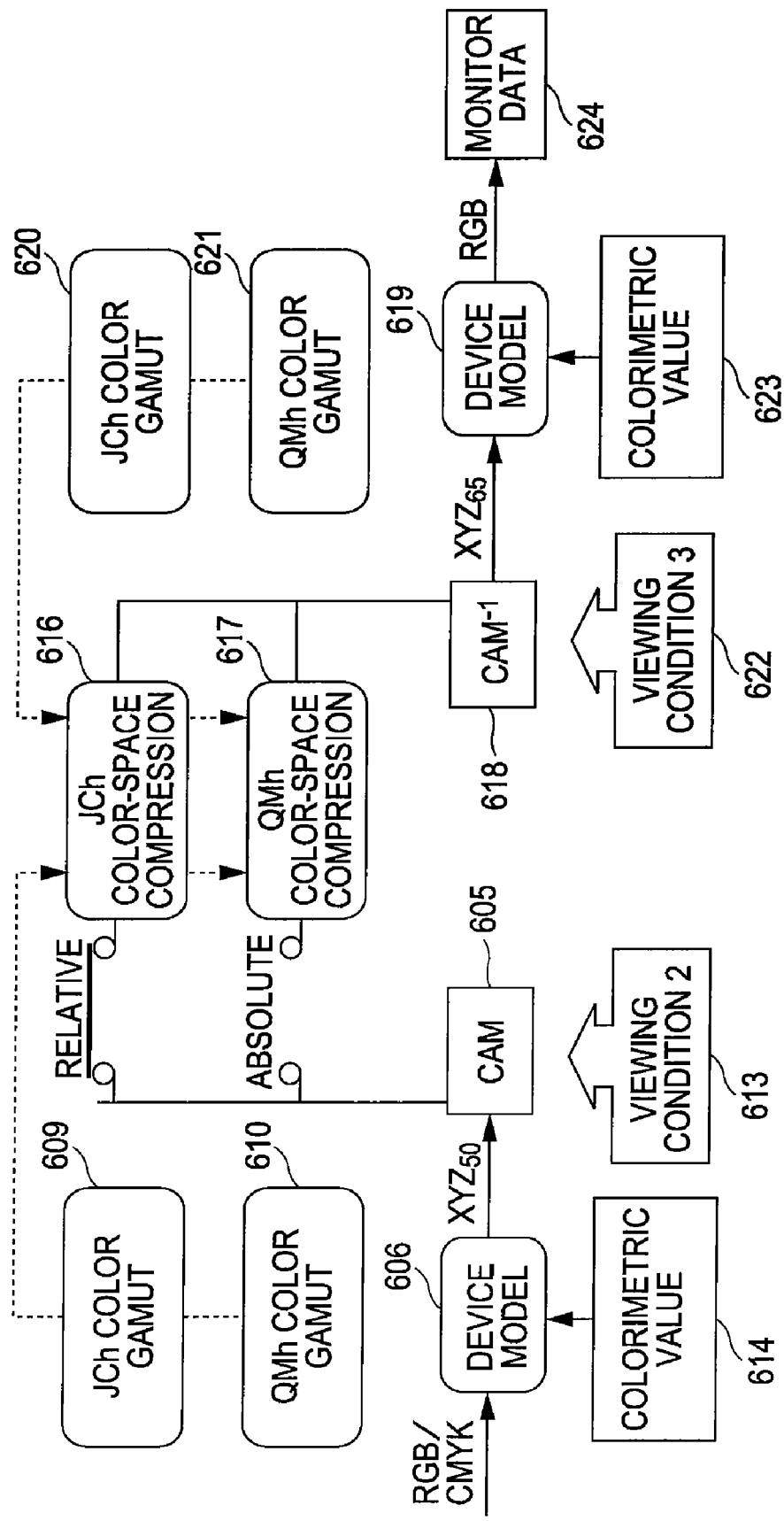
Figure 7:
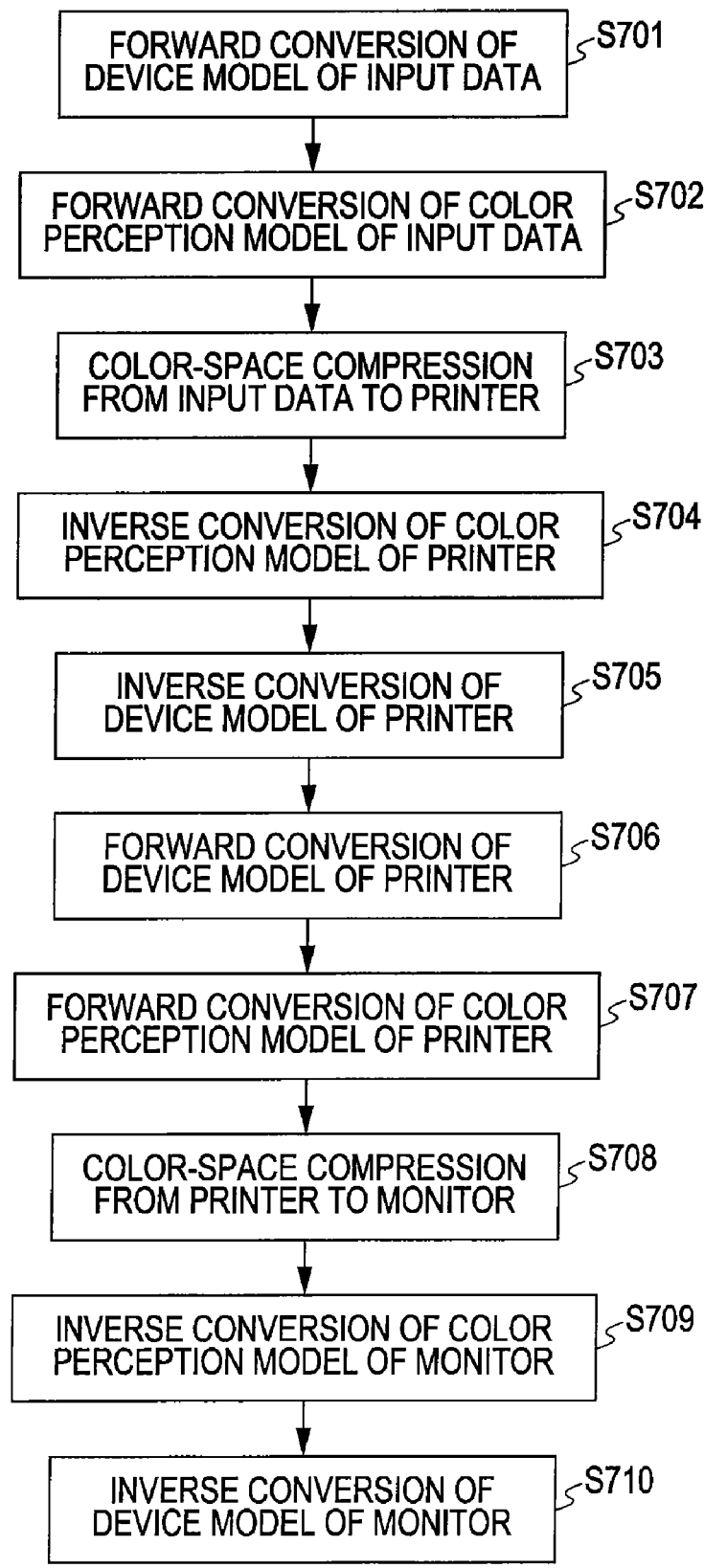
FIG. 7 is a flowchart showing a procedure of processing executed under the configuration shown in FIGS. 6A and 6B.

First, an overview of processing according to the related art will be described with reference to FIGS. 6A and 6B and FIG. 7.

First, output data 615 for the printer as the first output device is obtained from input data 600. Then, output data 624 for the monitor as the second output device is obtained from the output data 615 for the printer.

Then, a device model 601 of the input data, a device model 606 of the printer, and a device model 619 of the monitor are generated using calorimetric values 611 associated with the input data, calorimetric values 614 for the printer, and calorimetric values 623 for the monitor.

Then, a color gamut 607 (or 608) of the input data, a color gamut 609 (or 610) of the printer, and a color gamut 620 (or 621) of the monitor on a human color perception space are obtained.

A viewing condition 612 of the input data is set in a color perception model for the input data, a viewing condition 613 of an output of the printer (hereinafter referred to as a viewing condition of the printer) is set in a color perception model of the printer, and a viewing condition 622 of an output of the monitor (hereinafter referred to as a viewing condition of the monitor) is set in a color perception model for the monitor.

On the basis of the device models and color gamuts of the input data, printer, and monitor, color matching is executed. Color conversion from input colors of the input data to output colors of the printer and output colors of the monitor in consideration of color-space compression on the human color perception space JCh can be executed in the following manner.

First, in step S701, the forward conversion of the device model 601 of the input data is applied to the input colors to obtain XYZ values. Then, in step S702, the forward conversion of a color perception model 602 based on the viewing condition 612 of the input data is applied to obtain JCh values.

Then, in step S703, color-space compression 603 is executed on the basis of the color gamut 607 of the input data and the color gamut 609 of the printer. Then, in step S704, the inverse conversion of a color perception model 605 based on the viewing condition 613 of the printer is applied to the JCh values after the color-space compression to obtain XYZ values. Then, in step S705, the inverse conversion of the device model 606 of the printer is applied to obtain output colors for the printer.

Although color-space compression is executed on the human color perception space JCh in the example described above, color conversion from device colors of the input data to device colors of the printer can be executed similarly through color-space compression on the human color perception space QMh. In this case, the color gamut 608 of the input data, the color gamut 610 of the printer, color space compression 604, and so forth are used.

Furthermore, in step S706, the forward conversion of the device model 606 of the printer is applied to the output colors for the printer to obtain XYZ values. Then, in step S707, the forward conversion of the color perception model 605 based on the viewing condition 613 of the printer is applied to obtain JCh values. Then, in step S708, color-space compression 616 is executed on the basis of the color gamut 609 of the printer and the color gamut 620 of the monitor. In step S709, the inverse conversion of a color perception model 618 based on the viewing condition 622 of the monitor is applied to the JCh values after the color-space compression to obtain XYZ values. Then, in step S710, the inverse conversion of the device model 619 of the monitor is applied to obtain output colors for the monitor.

The device model, calorimetric values, viewing condition, color perception model based on the viewing condition, and the color gamut of the printer that are used when output colors for the printer are converted to output colors for the monitor in the processing described above are the same as those that are used when input colors are converted to output colors for the printer.

Considering what has been described above, the processing executed in the two steps S704 and S705 and the processing executed in the two steps S706 and S707 are the inverse of each other. That is, the JCh values or QMh values that serve as output in step S703 are the same as the JCh values or QMh values that serve as input in step S708.

Thus, when input data is to be output to two different output devices and an output of a first output device is simulated or previewed on a second output device, in a processing system according to the related art, the processing in steps S704 to S707 is useless. Accordingly, the processing load increases and the processing speed decreases. When an output of the printer is previewed on the monitor, processing speed is an important factor, so that it is desired that the processing speed be as fast as possible.

In order to overcome the problem of the related art described above, according to this embodiment, processing is executed in a manner described below with reference to FIGS. 8 and 9.

First, output data 615 for the printer as the first output device is obtained from the input data 600. Then, output data 624 for the monitor as the second output device is obtained from the output data 615 for the printer.

Then, a device model 601 of the input data, a device model 606 of the printer, and a device model 619 of the printer are generated using the calorimetric values 611 associated with the input data, the calorimetric values 614 for the printer, and the calorimetric values 623 for the monitor.

Then, a color gamut 607 (or 608) of the input data, a color gamut 609 (or 610) of the printer, and a color gamut 620 (or 621) of the monitor on a human color perception space are obtained.

The viewing condition 612 of the input data is set in the color perception model of the input data, the viewing condition 613 of the printer is set in the color perception model of the printer, and the viewing condition 622 of the monitor is set in the color perception model of the monitor.

On the basis of the device models and color gamuts of the input data, printer, and monitor, color matching is executed. Color conversion from input colors of the input data to output colors of the printer and output colors of the monitor in consideration of color-space compression on the human color perception space JCh can be executed in the following manner.

First, in step S901, the forward conversion of the device model 601 of the input data is applied to input colors to obtain XYZ values. Then, in step S902, the forward conversion of the color perception model 602 based on the viewing condition 612 of the input data is applied to obtain JCh values. Then, in step S903, the color-space compression 603 is executed on the basis of the color gamut 607 of the input data and the color gamut 609 of the printer. The color-space compression can be executed in different modes in accordance with the type of color reproduction desired, such as perceptual color reproduction, saturation color reproduction, calorimetric color reproduction, preferred color reproduction, or memory color reproduction.

Color conversion of device colors of the input data to device colors of the printer in consideration of color-space compression on the human color perception space QMh can be executed in a similar manner. In this case, the color conversion can be executed using the color gamut 608 of the input data, the color gamut 610 of the printer, the color-space compression 604, and so forth.

Then, in step S904, the color-space compression 616 is executed on the basis of the color gamut 609 of the printer and the color gamut 620 of the monitor. From the perspective of previewing an output of the printer on the monitor, it is desired that the calorimetric color reproduction mode be selected for the color-space compression. Then, in step S905, the inverse conversion of the color perception model 618 based on the viewing condition 622 of the monitor is applied to the JCh values after the color-space compression to obtain XYZ values. Then, in step S906, the inverse conversion of the device model 619 of the monitor is applied to obtain output colors for the monitor.

As opposed to the related art, in which color conversion is executed ten times, according to this embodiment, color conversion is executed only six times. Thus, the processing speed can be increased considerably.

Furthermore, according to this embodiment, it is possible to reproduce colors in consideration of the reference white point and environment illumination, which has not hitherto been possible through processing based on ICC profiles. Furthermore, according to this embodiment, it is possible to execute color-space compression optimally in accordance with a combination of color gamuts of an input device and an output device involved in color matching.

Since the processing according to the flow described above is executed for the purpose of previewing, output data for the printer is not generated. When output data for the printer is to be generated, similarly to the case of the related art, first, the forward conversion of the device model 601 of the input data is applied to input colors to obtain XYZ values. Then, the forward conversion of the color perception model 602 based on the viewing condition 612 of the input data is applied to obtain JCh values. Then, the color-space compression 603 is executed on the basis of the color gamut 607 of the input data and the color gamut 609 of the printer. Furthermore, the inverse conversion of the color perception model 605 based on the viewing condition 613 of the printer is applied to the JCh values after the color-space compression to obtain XYZ values. Then, the inverse conversion of the device model 606 of the printer is applied to obtain output colors for the printer. Compared with the processing steps for previewing, the processing executed in steps S901, S902, and S903 is the same. Thus, the processing can be omitted by storing XYZ values obtained after step S903 in the course of the processing for previewing and then reusing the XYZ values when obtaining output data for the printer.

The color processing including the steps described above is defined by an LUT and an equation such as a matrix. Since the color processing varies depending on the device model, calorimetric values, viewing condition, color gamut, and so forth of the devices used, in some cases, the LUT and the equation such as a matrix are generated dynamically in the course of processing. When the LUT and the equation such as a matrix are generated dynamically, the accuracy of the LUT and the equation considerably affects the processing speed. For the purpose of previewing on the monitor, in some cases, the accuracy need not be as high as in the case of output by the printer. In such cases, the accuracy of the LUT and equation defining the color processing in steps S901, S902, S903, S904, S905, and S906, used for previewing on the monitor, may be reduced. The accuracy may be reduced, for example, by reducing the number of grid points in the case of the LUT or reducing the order in the case of the equation. In the case of output to the printer, the accuracy of output is more important than the processing speed, so that color processing is executed without reducing the accuracy.

Also, when the processing in steps S901, S902, and S903 is shared between previewing on the monitor and output to the printer as described earlier, it is possible to reduce the accuracy of color processing in steps S904, S905, and S906, which is relevant only to previewing, without reducing the accuracy of color processing in steps S901, S902, and S903.

In the exemplary embodiment described above, the series of processing steps is executed on a host computer that is connected to the printer and the monitor and that is capable of controlling the two output devices. That is, the processing according to this embodiment can be implemented in the form of a computer program.

Second Exemplary Embodiment

In the above description of the first exemplary embodiment, the processing flow of output for previewing on the monitor and the processing flow of output by the printer are described separately. Actually, however, the output for previewing and the output by the printer are closely related to each other. For example, when the user is satisfied with a preview that is output on the monitor, the user outputs the data as it is by the printer. When the user is not satisfied, the user modifies the input data, changes the printer profile, changes the mode of color-space compression from input data to printer data, or otherwise performs an adjustment, and again previews an output on the monitor. When the user is satisfied with the preview, the user outputs the data by the printer. When the user is still not satisfied, the user performs an adjustment again.

Figure 10:
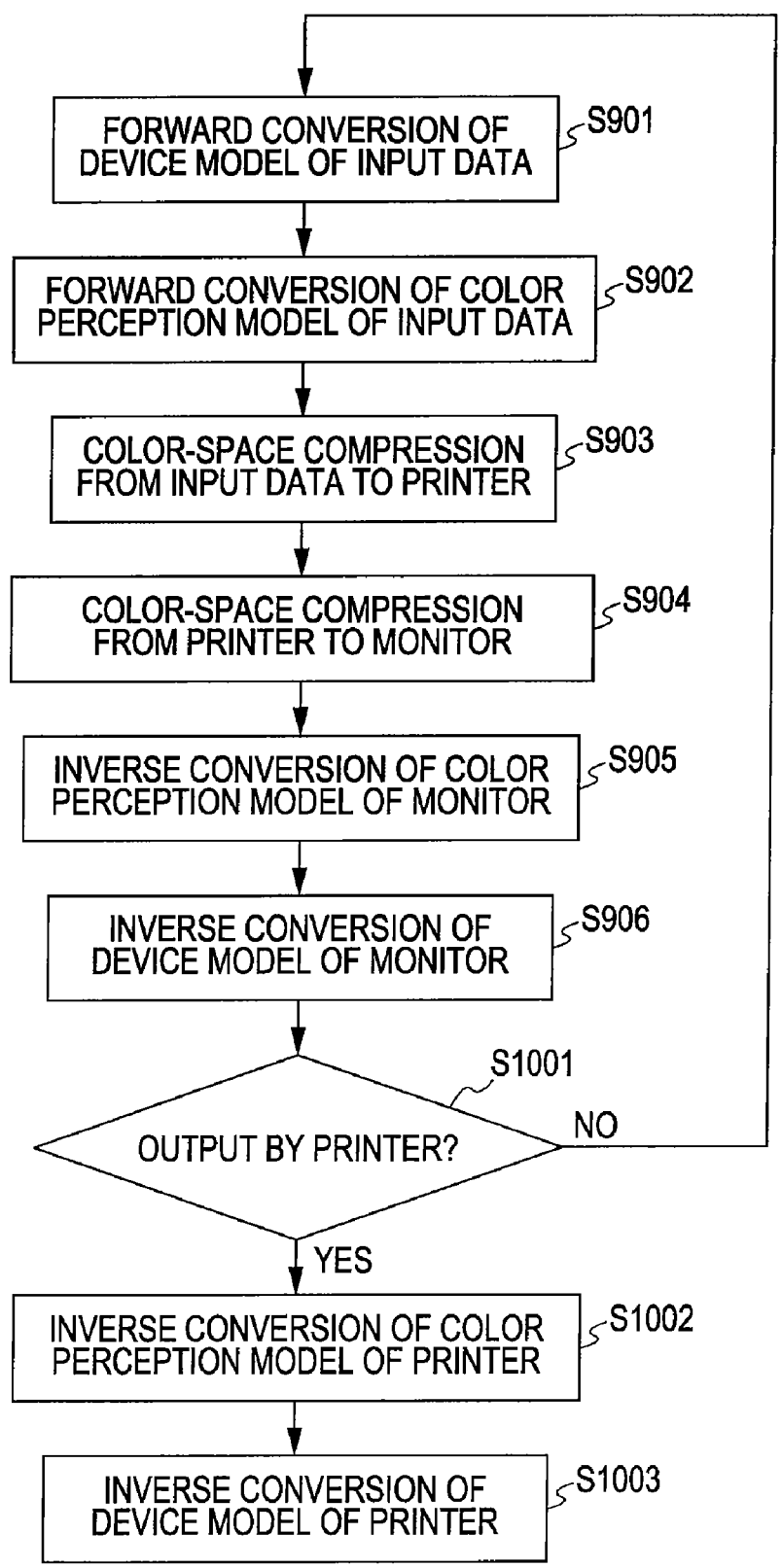
FIG. 10 is a flowchart showing a procedure of processing executed in a second exemplary embodiment of the present invention.

FIG. 10 is a flowchart showing a procedure of processing according to a second exemplary embodiment of the present invention. Similarly to the first embodiment, first, in step S901, the forward conversion of the device model 601 of input data is applied to input colors to obtain XYZ values. Then, in step S902, the forward conversion of the color perception model 602 based on the viewing condition 612 of the input data is applied to obtain JCh values. Then, in step S903, the color space compression 603 is executed on the basis of the color gamut 607 of the input data and the color gamut 609 of the printer. The mode of color-space compression can be changed in accordance with the desired type of color reproduction.

The color conversion from the device colors of the input data to the device colors of the printer can be executed in a similar manner in consideration of color-space compression on the human color perception space QMh. In this case, the color conversion can be executed using the color gamut 608 of the input data, the color gamut 610 of the printer, the color-space compression 604, and so forth.

Then, in step S904, the color-space compression 616 is executed on the basis of the color gamut 609 of the printer and the color gamut 620 of the monitor. From the perspective of previewing an output by the printer simulated on the monitor, it is desired that the calorimetric color reproduction mode be selected for the color-space compression in this case. In step S905, the inverse conversion of the color perception model 618 based on the viewing condition 622 of the monitor is applied to the JCh values after the color-space compression to obtain XYZ values. Then, in step S906, the inverse conversion of the device model 619 of the monitor is applied to obtain output colors for the monitor.

In step S1001, the output colors for the monitor are displayed on the monitor as a preview. When it is indicated by the user that the user is satisfied with the preview, for example, when an instruction for starting a print is input via a keyboard, a mouse, or the like, the process proceeds to step S1002. On the other hand, when an instruction for executing color processing again is input, the process returns to step S901.

In step S1002, the inverse conversion of the color perception model 605 based on the viewing condition 614 of the printer is applied to the JCh values after the color-space compression, output in step S903, to obtain XYZ values. Then, in step S1003, the inverse conversion of the device model 606 of the printer is applied to obtain output colors for the printer, and the output colors are output to the printer.

Figure 12:
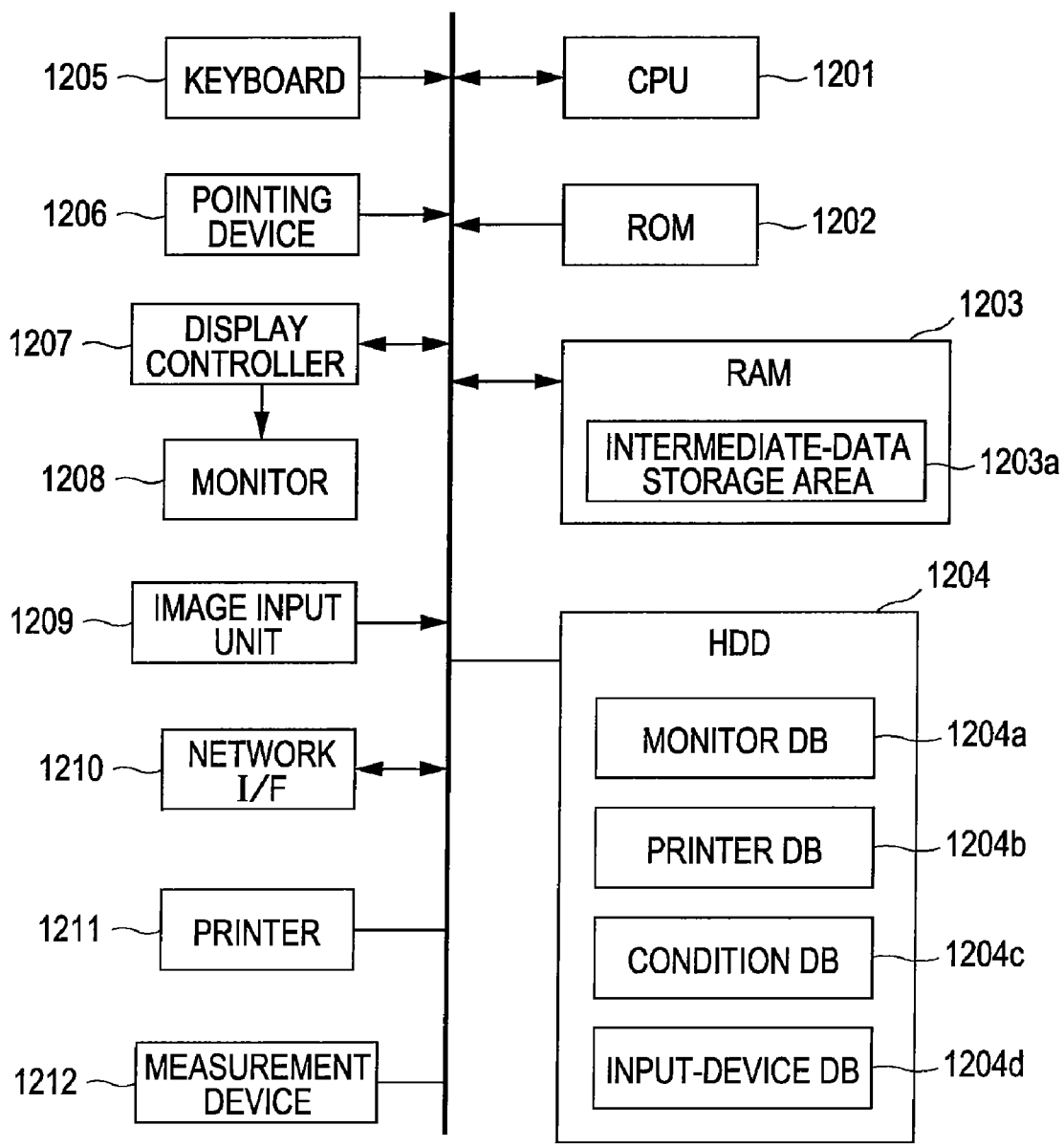
FIG. 12 is a block diagram showing the configuration of a computer in a case where processing according to an exemplary embodiment of the present invention is executed by a computer.

FIG. 12 is a block diagram of a computer for implementing what has been described above.

Referring to FIG. 12, a central processing unit (CPU) 1201 is in charge of exercising overall control on the computer. A read-only memory (ROM) 1202 stores a basic input/output system (BIOS) program and a boot program. A random access memory (RAM) 1203 is used as a work area for the CPU 1201. The RAM 1203 serves as an intermediate-data storage area 1203a for temporarily storing XYZ values obtained in step S903 described earlier. A hard disk drive 1204 stores an operating system (OS) and an application program for executing the processing according to this embodiment. Also, as shown in FIG. 12, the hard disk drive 1204 stores an input-device database (DB) 1204d, a printer DB 1204b, a monitor DB 1204a, and a condition DB 1204c, which will be described later in detail. A keyboard 1205 and a pointing device 1206 such as a mouse are provided. A display controller 1207 includes a video memory and a graphics processing unit (GPU) for drawing an image on the video memory. A monitor 1208 is implemented by a cathode-ray tube (CRT) display or a liquid crystal display. An image input unit 1209, for example, a scanner or a reader that reads image data stored on a storage medium, is provided. A network interface 1210 is also provided. Furthermore, a printer 1211 is provided. Furthermore, a measurement device 1212 that measures environment light and calorimetric values is provided.

An input-device DB 1204d, a printer DB 1204a, and a monitor DB 1204b stored in the hard disk drive 1204 include corresponding device models and information for constructing the devices models, such as calorimetric values. The input-device DB 1204d, printer DB 1204a, and monitor DB 1204b include information such as calorimetric values for each input device. Regarding printers, information such as calorimetric values is stored for each type of printer, each type of print sheet, and each grade of print quality. Similarly, regarding monitors, information such as calorimetric values is stored for each type of monitor and each display mode. When an input device, a printer, and a monitor to be used are selected by the user, information associated with the selected devices is read from the relevant databases and used. Also, it is possible to obtain calorimetric values through measurement by the measurement device 1212 and to add the calorimetric values to the databases.

In the printer DB 1204a stored in the hard disk drive 1204, information for constructing a device model of a printer that is used is stored for each type of printer. The user selects a piece of information to identify a printer 1211 that is to be used for output. In the monitor DB 1204b, information for constructing a monitor model is stored for each type of monitor. In the case of this embodiment, since the monitor 1208 is to be used, corresponding data is selected by default.

The condition DB 1204c is a database storing information regarding environment light, etc. For example, the condition DB 1204c stores information such as the type and luminance of environment light. That is, the condition DB 1204c allows selection from the environment lights D50 and D65 and the conditions 612, 613, and 622. Simply put, the condition DB 1204c stores information corresponding to solar light, fluorescent lamp, or incandescent lamp (manufacturer and product name). Furthermore, it is possible to obtain information regarding environment light by the measurement device 1212 and to add the information to the condition DB 1204c.

Figure 8:
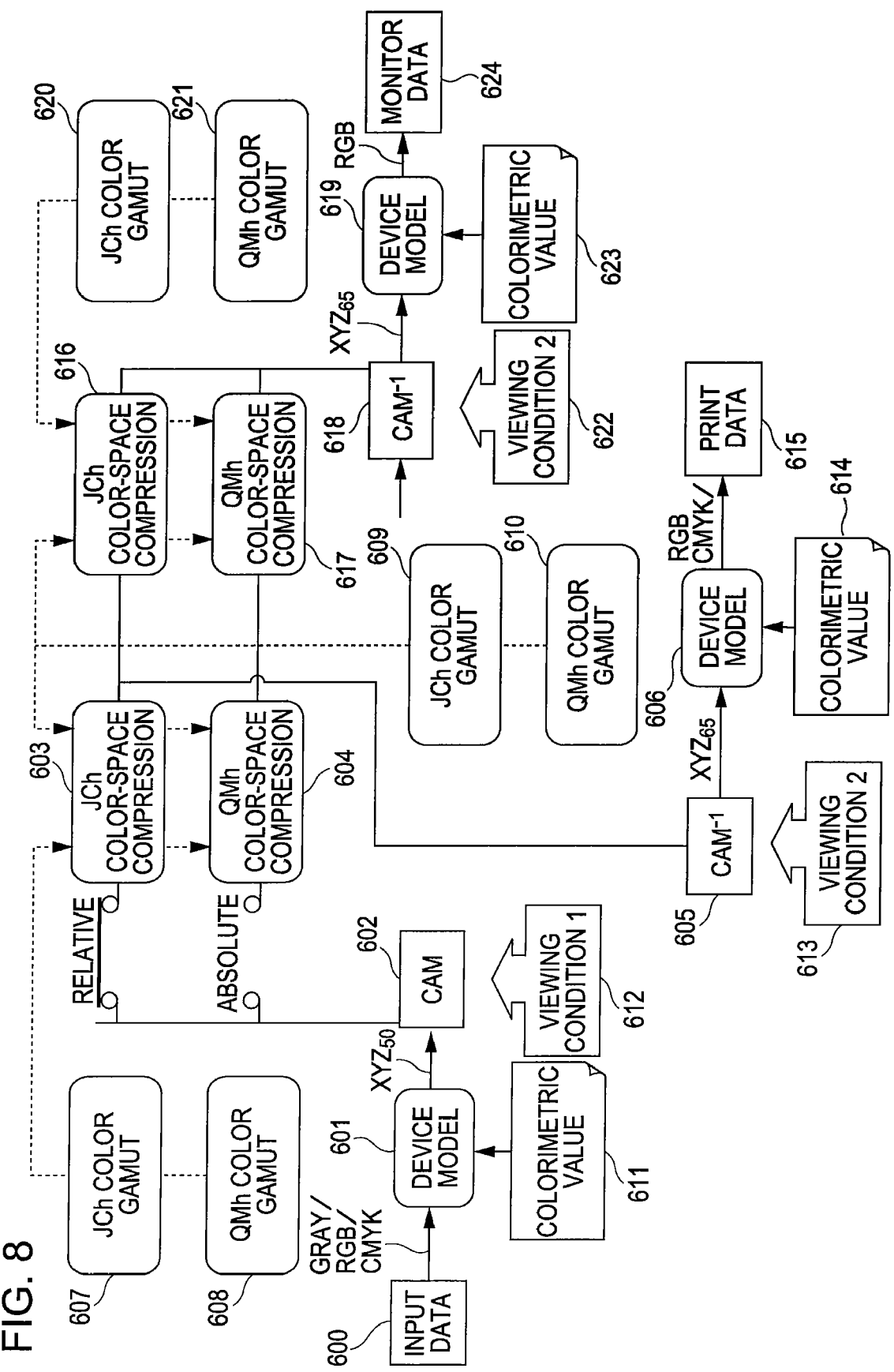
FIG. 8 is a block diagram showing a configuration for previewing an output of a printer by a monitor in an exemplary embodiment of the present invention.
Figure 9:
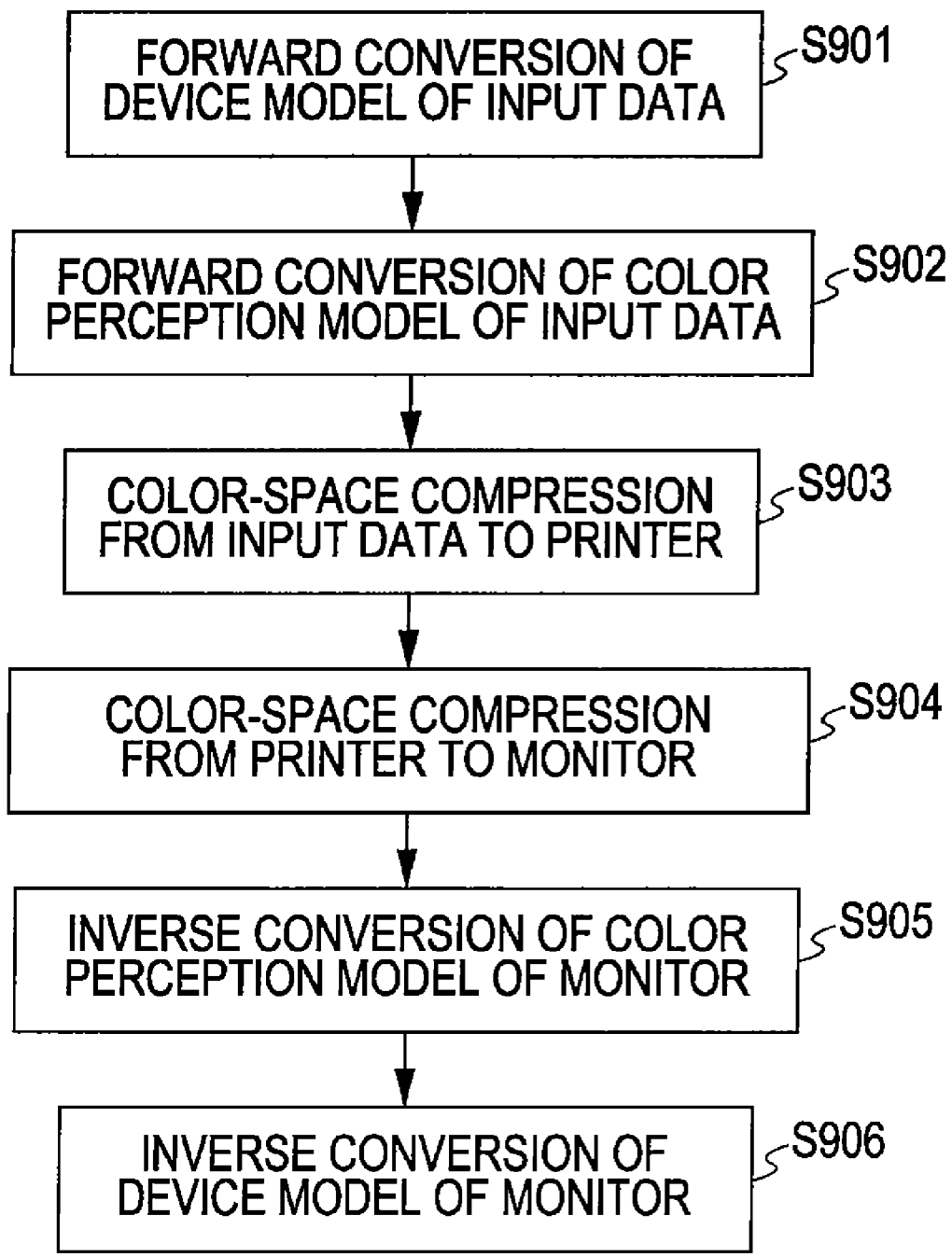
FIG. 9 is a flowchart showing a procedure of processing executed in an exemplary embodiment of the present invention.

The input data 600, the calorimetric values 611, and the conditions 612 shown in FIG. 8 are received together on the occasion of input via the image input unit 1209 or a network. Alternatively, these pieces of data may be stored in an HDD and put in databases.

When the application according to this exemplary embodiment is executed under the configuration described above, the user determines an input device, two output devices (a printer and a monitor in this embodiment), and conditions and calorimetric values for these devices with reference to the databases to execute color matching.

Third Exemplary Embodiment

In the exemplary embodiments described above, of the two output devices, a first output device is a printer and a second output device is a monitor. Alternatively, a first output device and a second output device may be a first printer and a second printer that is different from the first printer, respectively. For example, when the first printer is disposed at a remote location and the second printer is disposed near the user, it is possible to preview by the nearby printer an image printed by the remote printer.

Fourth Exemplary Embodiment

In the first to third exemplary embodiments described above, the series of processes is executed on a host computer connected to two output devices, such as a printer and a monitor. However, an output device that is disposed at a remote location and connected via a network may be used as long as the output device can be controlled. Also, a computer that allows exchanging output data via a network may be used even if it is not possible to exercise control. Also, it is possible to provide a printer with functions equivalent to functions of a host computer, connect another output device to the printer, and execute the series of processes on the printer.

Since it is possible to implement the present invention in the form of an application program that is executed on a general-purpose information processing apparatus such as a personal computer as described in the context of the embodiments, obviously, the scope of the present invention covers a computer program. Also, since a computer program is usually stored on a computer-readable storage medium such as a CD-ROM, and the computer-readable storage medium storing the computer program is set to a computer and the computer program is copied or installed on the system so that the computer program can be executed. Thus, the scope of the present invention covers such a computer-readable storage medium.

As described hereinabove, according to the present invention, it is possible to overcome the problem of the reference white point and environment illumination associated with the use of ICC profiles, and to simulate an output of a target output device in advance by another output device with a small number of times of color conversion.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-264439 filed Sep. 12, 2005, which is hereby incorporated by reference herein in its entirety.

What is claimed is:

1. An information processing method, performed by an information processing apparatus including a processing unit, for simulating a result output from a first output device based on input data represented in a color space that is dependent on an input device by a second output device, the information processing method comprising:

a first converting step of converting, by the processing unit, the input data into first data represented in a device-independent color space that is dependent on an input viewing condition using a forward conversion of an input device model;

a second converting step of converting, by the processing unit, the first data into second data represented in a color perception space that is independent of a viewing condition using a forward conversion of a color perception model based on an input viewing condition;

a third converting step of converting, by the processing unit, the second data into third data by executing color-space compression in accordance with a color gamut of the first output device;

a fourth converting step of converting, by the processing unit, the third data into fourth data by executing color-space compression in accordance with a color gamut of the second output device;

a fifth converting step of converting, by the processing unit, the fourth data into fifth data represented in the device-independent color space using an inverse conversion of the color perception model based on a first output viewing condition for the second output device;

a sixth converting step of converting, by the processing unit, the fifth data into output data represented in a color space that is dependent on the second output device for outputting to the second output device using an inverse conversion of an output device model for the second output device; and an outputting step of outputting the converted fifth data to the second output device, and of outputting the converted fifth data to the second output device;

a storing step of storing the third data obtained in the third converting step temporarily in a predetermined memory;

an input step of inputting an instruction for selecting, either to output the image by the first output device or to execute processing again from the first converting step to the sixth converting step with a modified condition;

a seventh converting step of converting the third data stored in the storing step into the seventh data represented in the device-independent color space using the inverse conversion of the color perception model based on a second output viewing condition for the first output device, when an instruction for output by the first device is input in the input step; and an eighth converting step of converting the seventh data into output data represented in a color space that is dependent on the first output device for outputting to the first output device.

2. The information processing method according to claim 1, wherein the first output device is a printer and the second output device is a display.

3. A non-transitory computer-readable storage medium having stored thereon a computer program for allowing a computer to execute steps of an information processing method for simulating a result output from a first output device based on input data represented in a color space that is dependent on an input device by a second output device, the information processing method comprising:

a first converting step of converting, by the processing unit, the input data into first data represented in a device-independent color space that is dependent on an input viewing condition using a forward conversion of an input device model;

a second converting step of converting, by the processing unit, the first data into second data represented in a color perception space that is independent of a viewing condition using a forward conversion of a color perception model based on an input viewing condition;

a third converting step of converting, by the processing unit, the second data into third data by executing color-space compression in accordance with a color gamut of the first output device;

a fourth converting step of converting, by the processing unit, the third data into fourth data by executing color-space compression in accordance with a color gamut of the second output device;

a fifth converting step of converting, by the processing unit, the fourth data into fifth data represented in the device-independent color space using an inverse conversion of the color perception model based on a first output viewing condition for the second output device;

a sixth converting step of converting, by the processing unit, the fifth data into output data represented in a color space that is dependent on the second output device for outputting to the second output device using an inverse conversion of an output device model for the second output device and of outputting the converted fifth data to the second output device;

a storing step of storing the third data obtained in the third converting step temporarily in a predetermined memory;

an input step of inputting an instruction for selecting, either to output the image by the first output device or to execute processing again from the first converting step to the sixth converting step with a modified condition;

a seventh converting step of converting the third data stored in the storing step into the seventh data represented in the device-independent color space using the inverse conversion of the color perception model based on a second output viewing condition for the first output device, when an instruction for output by the first device is input in the input step; and an eighth converting step of converting the seventh data into output data represented in a color space that is dependent on the first output device for outputting to the first output device.

4. An information processing apparatus for simulating a result output from a first output device based on input data represented in a color space that is dependent on an input device by a second output device, the information processing method comprising:

a first converter configured to perform a first conversion step to convert the input data into first data represented in a device-independent color space that is dependent on an input viewing condition using a forward conversion of an input device model;

a second converted configured to perform a second converting step to convert the first data into second data represented in a color perception space that is independent of a viewing condition using a forward conversion of a color perception model based on an input viewing condition;

a third converter configured to perform a third conversion step to convert the second data into third data by executing color-space compression in accordance with a color gamut of the first output device;

a fourth converter configured to perform a fourth conversion step to convert the third data into fourth data by executing color-space compression in accordance with a color gamut of the second output device;

a fifth converter configured to perform a fifth conversion step to convert the fourth data into fifth data represented in the device-independent color space using an inverse conversion of the color perception model based on a first output viewing condition for the second output device;

a sixth converter configured to perform a sixth conversion step to convert the fifth data into output data represented in a color space that is dependent on the second output device for outputting to the second output device using an inverse conversion of an output device model for the second output device and outputting the converted fifth data to the second output device;

a storage configured to store the third data obtained from the third conversion step performed by the third converter temporarily in a predetermined memory;

an instruction receiver configured to receive an instruction input for selecting either to output the image by the first output device or to execute processing again from the first conversion performed by the first converter to the sixth converting step performed by the sixth converter with a modified condition;

a seventh converter configured to perform a seventh conversion step convert the third data stored in the storing step into the seventh data represented in the device-independent color space using the inverse conversion of the color perception model based on a second output viewing condition for the first output device, when an instruction for output by the first device is received by the instruction receiver; and an eighth converter configured to perform an eighth conversion step to convert the seventh data into output data represented in a color space that is dependent on the first output device for outputting to the first output device.

5. The information processing method according to claim 1, wherein an accuracy of calculations of the fourth converting step to the sixth converting step is less than an accuracy of calculations of the first converting step to the third converting step.

* * * * *